United States Patent
Kimura

(10) Patent No.: US 6,819,976 B2
(45) Date of Patent: Nov. 16, 2004

(54) SERVICE PROVISION SUPPORT SYSTEM, SERVER AND COMPUTER PROGRAM

(75) Inventor: Shuji Kimura, Kato (JP)

(73) Assignee: Fujitsu Limited, Kawasaki (JP)

( * ) Notice: Subject to any disclaimer, the term of this patent is extended or adjusted under 35 U.S.C. 154(b) by 41 days.

(21) Appl. No.: 10/200,135

(22) Filed: Jul. 23, 2002

(65) Prior Publication Data
US 2003/0158624 A1 Aug. 21, 2003

(30) Foreign Application Priority Data
Feb. 4, 2002 (JP) .................................. 2002-026685

(51) Int. Cl.[7] .............................................. G06F 17/00
(52) U.S. Cl. ...................................... 700/237; 700/233
(58) Field of Search ................................ 700/231, 232, 700/233, 237, 241

(56) References Cited
U.S. PATENT DOCUMENTS 6,430,470 B1 * 8/2002 Nakajima et al. ........... 700/237
6,462,644 B1 * 10/2002 Howell et al. ............. 340/5.92
6,594,548 B2 * 7/2003 Bagnordi ..................... 700/233

* cited by examiner

Primary Examiner—Khoi H. Tran
(74) Attorney, Agent, or Firm—Staas & Halsey LLP

(57) ABSTRACT

A vending machine includes a request receiving portion for receiving request information of products desired by a user; a receipt number issuing portion for issuing receipt number information for each of the received request information; an information storing portion for storing the request information in connection with the receipt number issuing portion, a receipt number transmitting portion for transmitting receipt number information to the terminal designated by the user who made the request, a receipt number obtaining portion for obtaining the receipt number information from the terminal of the user who came to the front of the vending machine, a job information extracting portion for extracting the request information corresponding to the obtained receipt number information from the information storing portion and a job controlling portion for controlling the product to be ejected to an outlet portion in accordance with the extracted request information.

16 Claims, 22 Drawing Sheets

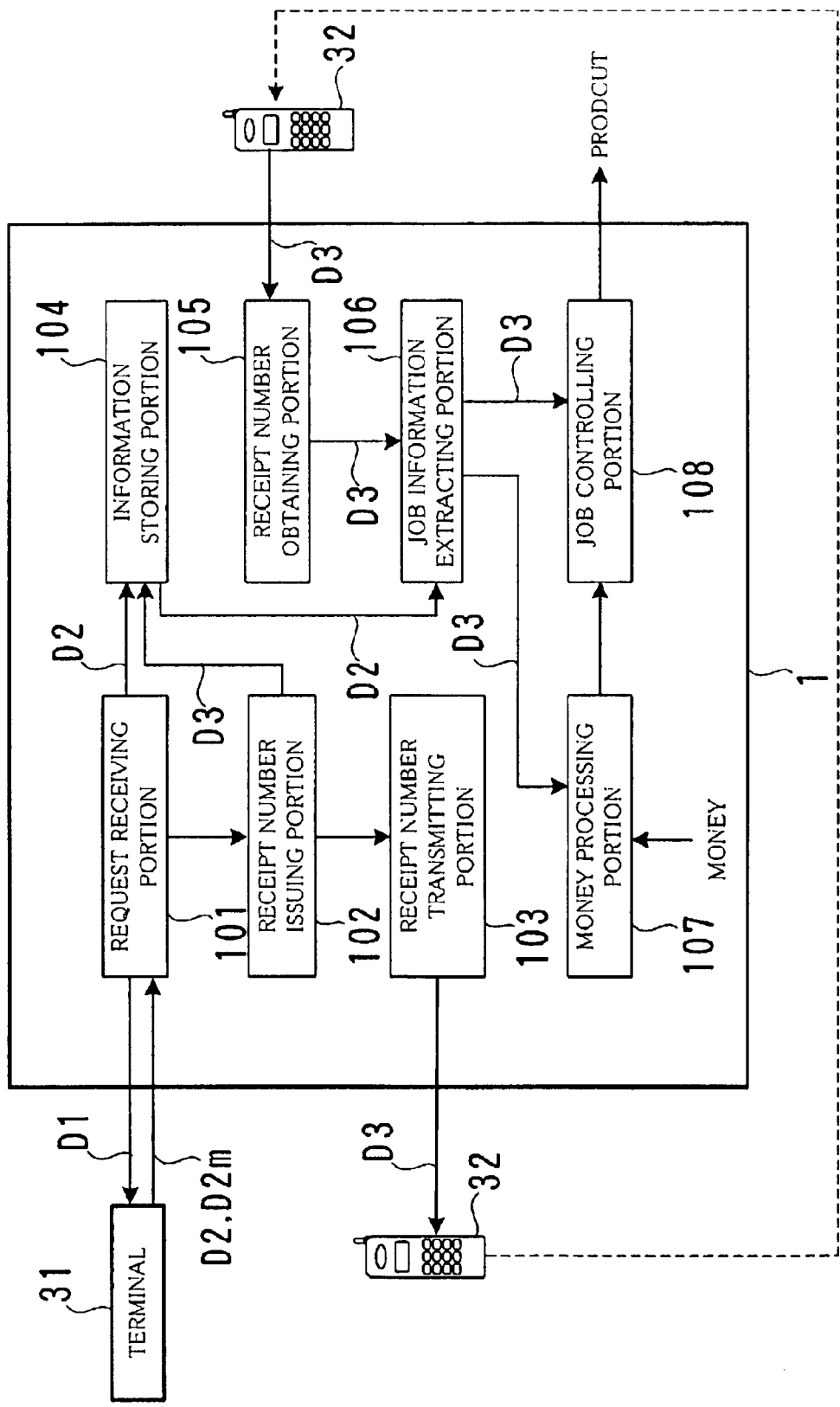

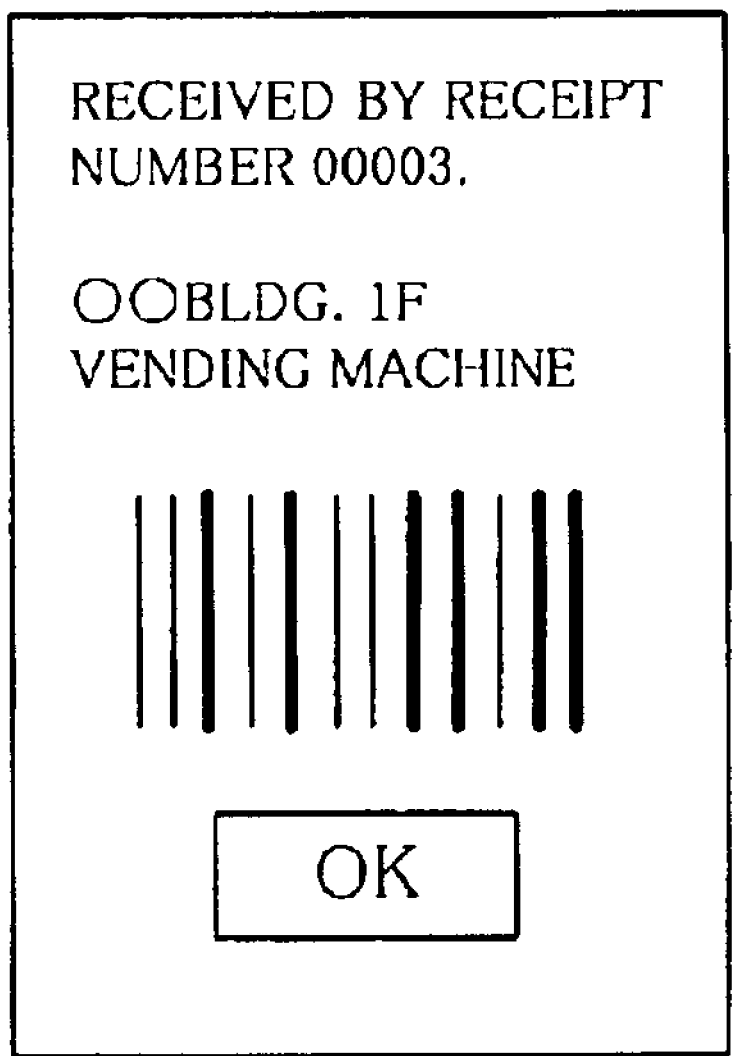

FIG.6

| RECEIPT NUMBER (D3) | REQUEST INFORMATION (JOB INFORMATION) (D2) | COMPLETION INFORMATION (D6) |
|---|---|---|
| 00001 | COFFEE×2, ORANGE JUICE×2, COKE×1 | COMPLETED |
| 00002 | COFFEE×2, GREEN TEA×5 | COMPLETED |
| 00003 | COFFEE×3, ORANGE JUICE×2 | UNCOMPLETED |
| 00004 | COKE×3, TEA WITH MILK×2 | UNCOMPLETED |
| 00005 | ORANGE JUICE×1, GREEN TEA×2, COKE×2 | COMPLETED |
| ⋮ | ⋮ | ⋮ |

RECEIVED YOUR ORDER.

○○BLDG. 1F
VENDING MACHINE

|  |  |  |  | SUBTOTAL |
| --- | --- | --- | --- | --- |
| · HAMBURGER | ¥1,200 × | 2 | PORTION ( S ) | ¥2,400 |
| · CURRY AND RICE | ¥900 × | 1 | PORTION ( S ) | ¥900 |
| · SUSHI | ¥1,800 × | 1 | PORTION ( S ) | ¥1,800 |
| · NOODLE | ¥800 × | 1 | PORTION ( S ) | ¥800 |
| · CHINESE NOODLE | ¥1,000 × | 0 | PORTION ( S ) | |

GRAND TOTAL: ¥5,900

MEMBERSHIP IDENTIFICATION NUMBER : 001-23456

[SEND]  [CANCEL]

| PERIOD OF TIME | VENDING MACHINE 71 | VENDING MACHINE 72 | ... |
|---|---:|---:|---|
| 1/1~1/7 | ¥201,600 | ¥129,600 | ... |
| 1/8~1/14 | ¥213,480 | ¥200,880 | ... |
| 1/15~1/21 | ¥198,480 | ¥225,120 | ... |
| ⋮ | ⋮ | ⋮ | ... |

| RECEIPT NUMBER (D3) | REQUEST INFORMATION (JOB INFORMATION) (D2) | COMPLETION INFORMATION | NAME OF VENDING MACHINE USED FOR VENDING (D6) |
|---|---|---|---|
| 00001 | COFFEE×2, ORANGE JUICE×2, COKE×1 | COMPLETED | VENDING MACHINE 71 |
| 00002 | COFFEE×2, GREEN TEA×5 | COMPLETED | VENDING MACHINE 72 |
| 00003 | COFFEE×3, ORANGE JUICE×2 | UNCOMPLETED | |
| 00004 | COKE×3, TEA WITH MILK×2 | UNCOMPLETED | |
| 00005 | ORANGE JUICE×1, GREEN TEA×2, COKE×2 | COMPLETED | VENDING MACHINE 71 |
| ⋮ | ⋮ | ⋮ | ⋮ |

HG4

SERVICE PROVISION SUPPORT SYSTEM, SERVER AND COMPUTER PROGRAM

BACKGROUND OF THE INVENTION

1. Field of the Invention

The present invention relates to a service provision support system that is used for providing users with service.

2. Description of the Prior Art

Recently, customer needs have been diversified, and contents of services provided to users have also been diversified and are changing every day. Therefore, a user may have to select a desired service from a lot of choices when receiving service provision.

For example, many kinds of dishes are prepared and listed on a menu at a restaurant. The contents of the menu may be changed in accordance with the time or the season. Therefore, it is possible that the user cannot make up his or her mind for selecting a best choice, so as to keep a waiter or a waitress waiting for a long time. Otherwise, the user may regret his or her haste decision without enough consideration because of hesitation in keeping a waiter or a waitress waiting.

In addition, it is possible that the diversification of service contents deteriorates usability features of a machine operated by users. For example, a ticket-vending machine for a railway is used for vending not only a normal ticket but also other kinds of tickets such as an express ticket, a book of tickets, a day-time book of tickets, a discount ticket, a transfer ticket to another railway, a transfer ticket to a bus, various kinds of prepaid cards or a commuter ticket. Therefore, the user has to designate not only a section of track but also the kind of the ticket. As a result, it may take the user relatively long time to buy a ticket because of the complicated operation of the vending machine. The user may mistake the operation of the vending machine when he or she worries about people behind him or her in line.

A vending machine for drinks may be used for vending mainly cold drinks in hot season and hot drinks in cold season. Furthermore, since a lot of new products have been sold recently, drinks in a vending machine may be replaced with new products in a short period of time not depending on the season. In addition, if drinks are served in a paper cup, a user can select ice or non-ice and increase or decrease quantities of sugar and milk. Therefore, similarly to a case of a restaurant or a ticket-vending machine, it is possible that the user cannot make up his or her mind for selecting a desired drink, or linger over his or her decision, or mistake the operation of the vending machine when he or she worries about people behind him or her in line.

The above-mentioned problems may be more conspicuous as the service becomes more diversified, resulting in unintended loss of convenience for users.

For this reason, some methods are proposed for a user to select easily desired one from many choices. For example, one of the proposed methods uses a large touch panel located on the machine that user operates, and the user selects desired one in accordance with a guidance displayed on a screen.

However, even if guidance is displayed on the large touch panel, it takes considerable period of time for users to be accustomed to the operation. Therefore, the above-mentioned problems are not solved yet. In addition, a machine with a large touch panel requires cost higher than the conventional machine equipped with push buttons.

There are other improved methods that enable users to select desired one from many options easily at low cost, in which a plurality of functions (using modes) is assigned to one key of a machine, or display screens of the conventional touch panel are displayed in a hierarchical menu form. However, they are not user friendly because they require the user to operate by more steps than the conventional machine.

SUMMARY OF THE INVENTION

An object of the present invention is to provide a service provision support system that has good usability features, so that users can select desired one without worrying about a salesclerk or people behind him or her waiting in line.

A service provision support system according to the present invention is a service provision support system for performing a process for providing a service to a user. The system comprises means for receiving request information of service provision, means for issuing identifying information for each of the received request information, means for storing the received request information in connection with the identifying information issued about the request information, means for transmitting the issued identifying information to a terminal designated by the user who requested the service corresponding to the identifying information, means for obtaining the identifying information received by the terminal of the user who had access to a service provision site from the same terminal, means for extracting the request information from the storing means, the request information corresponding to one that is identical to the identifying information obtained by the obtaining means among the identifying information stored in the storing means; and means for controlling a thing for service provision in accordance with the extracted request information.

Another form of the service provision support system comprises means for transmitting the received request information as job information to a terminal designated by the user who requested the service corresponding to the request information, means for obtaining the job information received by the terminal of the user who had access to a service provision site from the same terminal, and means for controlling a thing for service provision in accordance with the obtained job information.

In another aspect, the system comprises means for storing the received request information in connection with user identifying information for identifying the user who sent the request information, means for obtaining the user identifying information of the user from a possession of the user who had access to a service provision site, and means for extracting the request information from the storing means, the request information corresponding to one that is identical to the user identifying information obtained by the obtaining means among the user identifying information stored in the storing means.

The service provision support system may comprise a server and a plurality of service provision processors. In this case, the server includes means for receiving request information of service provision, means for issuing identifying information for each of the received request information, means for storing the received request information in connection with the identifying information issued about the request information, means for transmitting the issued identifying information to a terminal designated by the user who requested the service corresponding to the identifying information, means for extracting the request information requested by the service provision processor from the storing means, and means for transmitting the extracted request information to the service provision processor that made the request. The service provision processor includes means for obtaining the identifying information received by the terminal of the user who had access to a service provision site from the same terminal, means for requesting the server for the request information corresponding to one that is identical to the identifying information obtained by the obtaining means among the identifying information stored in the storing means, and means for controlling a thing for service provision in accordance with the request information obtained from the server.

The service provision processor may include means for transmitting sales information concerning sales of the service provision processor to the server, and the server may include means for calculating fee that is charged to an owner of the service provision processor in accordance with the sales information obtained from the service provision processor.

A server according to the present invention is a server that is used for a service provision support system for performing a process for providing a service to a user. The server comprises means for receiving request information of service provision, means for issuing identifying information for each of the received request information, means for storing the received request information in connection with the identifying information issued about the request information, means for transmitting the issued identifying information to a terminal designated by the user who requested the service corresponding to the identifying information, means for extracting the request information from the storing means, the request information corresponding to one that is identical to the identifying information designated by a service provision processor among the identifying information stored in the storing means, and means for transmitting the extracted request information to the service provision processor.

A vending machine according to the present invention is a vending machine that ejects a product stored therein responding to an instruction of a user. The vending machine comprises first transmission means for transmitting a product ordering screen to a user terminal via a network in accordance with an instruction from the user terminal, means for receiving request information written on the product ordering screen from the terminal, means for issuing identifying information responding to the received request information, means for storing the received request information in connection with the identifying information, second transmission means for transmitting the issued identifying information to the terminal designated by the user, means for obtaining the identifying information received by the terminal of the user who had access to the vending machine from the same terminal, means for extracting the request information from the storing means, the request information corresponding to one that is identical to the identifying information obtained by the obtaining means among the identifying information stored in the storing means, and means for controlling a product to be ejected in accordance with the extracted request information.

Furthermore, the service in the present invention includes sale of various products such as foods and drinks, music records and CDs or game software, refueling, provision of foods and drinks, ticket sale, money exchange, document copying and facsimile transmission.

BRIEF DESCRIPTION OF THE DRAWINGS

FIG. 3 is a diagram for explaining an example of a functional structure of the vending machine.

FIG. 5 is a diagram showing an example of a reception confirming screen.

FIG. 6 is a table showing an example of request information stored in an information storing portion.

FIG. 13 is a diagram showing an example of a dish ordering screen.

FIG. 16 is a diagram showing an example of sales information that is stored in the information storing portion.

FIG. 17 is a diagram showing a variation of the request information that is stored in the information storing portion.

DESCRIPTION OF THE PREFERRED EMBODIMENTS

Hereinafter, the present invention will be explained more in detail with reference to embodiments and drawings.
[First Embodiment]

Figure 1:
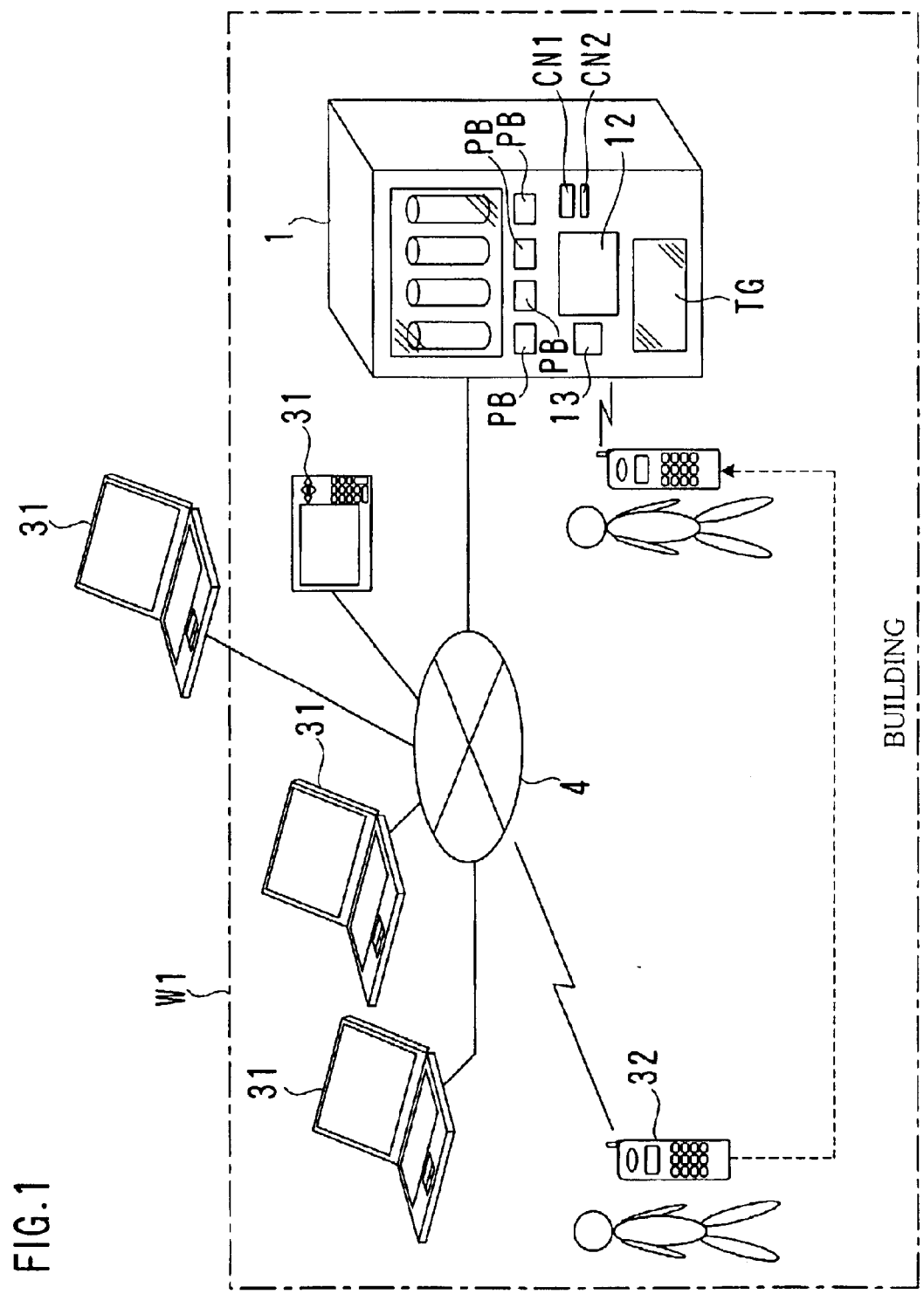
FIG. 1 is a diagram for explaining an example of a structure of a network system of a facility where a vending machine is installed according to the present invention.
Figure 2:
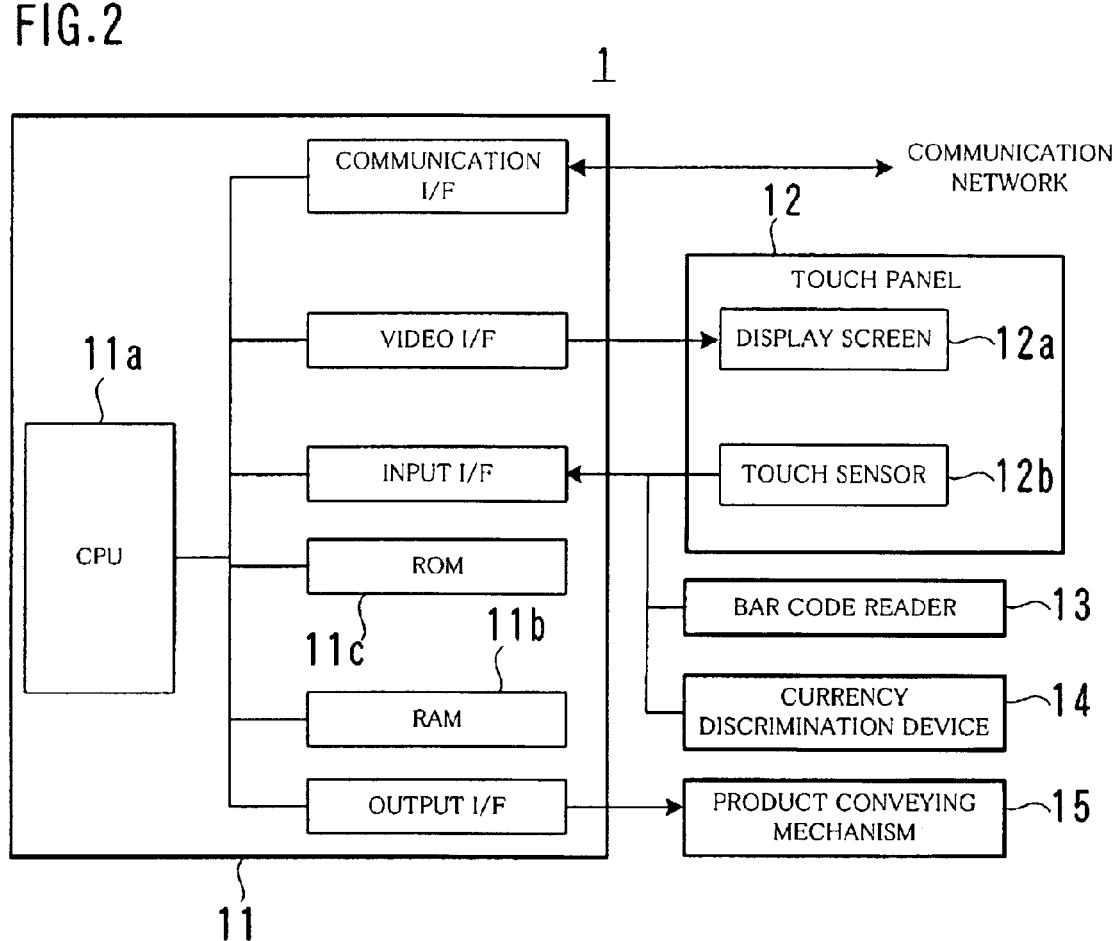
FIG. 2 is a diagram for explaining an example of a hardware structure of the vending machine.
Figure 4A:
FIGS. 4A and 4B show an example of a product ordering screen.
Figure 4B:
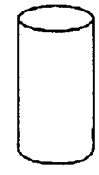

FIG. 1 is a diagram for explaining an example of a structure of a network system W1 of a facility where a vending machine 1 is installed according to the present invention. FIG. 2 is a diagram for explaining an example of a hardware structure of the vending machine 1. FIG. 3 is a diagram for explaining an example of a functional structure of the vending machine 1. FIGS. 4A and 4B show an example of a product ordering screen HG1. FIG. 5 is a diagram showing an example of a reception confirming screen HG2. FIG. 6 is a table showing an example of request information D2 stored in an information storing portion 104.

As shown in FIG. 1, the network system W1 includes a vending machine 1, a plurality of terminals 31 and communication network 4. The vending machine 1 is a machine that is used for vending drinks such as coffee or soft drinks, for example, which is installed at a lobby or other places in a building where many companies or organizations tenant. This vending machine 1 is used by employees of each tenant in the building and guests who visits the tenant.

The vending machine 1 and the terminals 31 of the tenants are connected with each other via the communication network 4, so that data can be transmitted and received. The communication network 4 can be the Internet, an intranet (LAN) or a public line. As a communication protocol, SMTP (Simple Mail Transfer Protocol) is used for transmitting electronic mails and HTTP (Hypertext Transfer Protocol) is used for transmitting and receiving web pages. It is possible to connect the terminal 31 located outside of the building with the communication network 4 for communicating with the vending machine 1 similarly to the terminal 31 of the tenant. The terminal 31 can be a personal computer, cell phone, a PHS cell phone or a PDA (Personal Digital Assistant) having a WWW browsing function.

When buying a product such as a soft drink using the vending machine 1, the user usually drops coins in a coin slot CN1 or inserts a bill in a bill slot CN2 and select a desired product by pressing a button PB corresponding to the product. Then, the user takes out the product that was moved to an outlet portion TG. In addition, a user can reserve a desired product in this vending machine 1 by remote control using the terminal 31 before going to the lobby or on the way to the lobby to buy the product.

As shown in FIG. 2, the vending machine 1 includes an operational processor 11, a touch panel 12, a bar code reader 13, a currency discrimination device 14 and a product conveying mechanism 15.

The operational processor 11 includes a CPU 11a, a RAM 11b, a ROM 11c and various interfaces. The ROM 11c stores various programs for executing processes that will be explained later. For example, an OS (operating system), a Web server program for transmitting data such as hypertexts for displaying web pages and image files, a CGI (Common Gateway Interface) program for accepting product orders, an electronic mail transmission program and other programs are stored. The RAM 11b stores data received from the terminals 31. Processes are executed by the CPU 11a in accordance with these programs and data as being explained later. It is possible to provide the vending machine 1 with a recording medium such as a hard disk for storing the programs or data, which are loaded to the RAM 11b in accordance with the process stage.

A display screen 12a of the touch panel 12 displays a guidance screen showing steps for buying a product. The user can operate the vending machine 1 by touching the display screen 12a in conjunction with seeing the guidance screen. When the display screen 12a is touched, a signal corresponding to the touched position is transmitted from a touch sensor 12b to the operational processor 11.

The bar code reader 13 reads a bar code printed on a paper sheet or a bar code (see FIG. 5) displayed on a display screen of a cell phone or other equipment. The currency discrimination device 14 discriminates coins dropped in the coin slot CN1 or a bill inserted in the bill slot CN2. The product conveying mechanism 15 conveys a product designated by the operational processor 11 from storage portion to the outlet portion TG.

The above-mentioned structure realizes functions of vending machine 1 as shown in FIG. 3, which include a request receiving portion 101, a receipt number issuing portion 102, a receipt number transmitting portion 103, an information storing portion 104, a receipt number obtaining portion 105, a job information extracting portion 106, a money processing portion 107 and a job controlling portion 108.

The request receiving portion 101 performs a process for accepting a request for a product (i.e., an order for a product) from the terminal 31. First, the request receiving portion 101 transmits screen information D1 for displaying a web page for ordering, to the terminal 31 that is used for ordering a product. The screen information D1 includes hypertexts described in a language such as HTML (Hypertext Markup Language) or XML (Extensible Markup Language) and necessary image files. It is possible for the terminal 31 to request the screen information D1 by designating a URL (Uniform Resource Locators) of the vending machine 1 by using a WWW browser.

A product ordering screen HG1 as shown in FIG. 4A is displayed on the display screen of the terminal 31 that received the screen information D1. The product ordering screen HG1 has text boxes TX (TXa, TXb, . . . ) for inputting quantity of each product that can be vended by the vending machine 1. The user inputs desired quantities in these text boxes TX and clicks the transmission ("SEND") button BN1, so as to order products to the vending machine 1. The text box TXm is used for inputting an electronic mail address of the terminal for receiving a confirmation notice that the order was accepted (see FIG. 5). For example, the electronic mail address of the cell phone 32 of the user is inputted. The cell phone 32 can be replaced with other type of terminal such as a PHS cell phone or a PDA.

When the transmission button BN1 is clicked, the terminal 31 transmits request information D2 indicating the product that the user desires to buy and quantity thereof to the vending machine 1. For example, in the product ordering screen HG1 shown in FIG. 4A, the request information D2 in which three cans of coffee and two cans of orange juice are requested is transmitted. In addition, the electronic mail address entered in the text box TXm as address information D2m is transmitted to the vending machine 1 together with the request information D2.

As shown in FIG. 3, when the request receiving portion 101 receives the request information D2 from the terminal 31, the receipt number issuing portion 102 issues a receipt number for discriminating the request information D2. The receipt number transmitting portion 103 transmits the receipt number as receipt number information D3 to the electronic mail address indicated in the address information D2m, i.e., to the cell phone 32.

The display screen of the cell phone 32 that received the receipt number information D3 displays a reception confirming screen HG2 as shown in FIG. 5. The bar code in the reception confirming screen HG2 indicates the receipt number information D3. The image of the bar code is generated by the receipt number transmitting portion 103 and is received together with the receipt number information D3.

In this embodiment, there are different terminals for ordering a product (the product ordering terminal 31) and for receiving the confirmation notice that the order was accepted (the cell phone or other product ordering terminal 32). However, it is possible to designate the (product ordering) terminal 31 that was used for ordering a product as also the product procuring terminal 32 for receiving the confirmation notice that the order was accepted, too. Of course, the terminal 31 has to be portable in that case, so as to perform both ordering and procuring functions.

As shown in FIG. 3, the information storing portion 104 memorizes the request information D2 received by the request receiving portion 101 in connection with the receipt number (the receipt number information D3) issued by the receipt number issuing portion 102 for the request information D2, as shown in FIG. 6. For example, in the case of the product ordering screen HG1 shown in FIG. 4A, the request information D2 whose contents are "three cans of coffee and two cans of orange juice" is memorized in connection with the receipt number "00003". The right edge column of the table shown in FIG. 6 is completion information D6 that indicates whether the product designated in the request information D2 is already received by the user or not.

The receipt number obtaining portion 105 obtains the receipt number information D3 from the user who came to the front of the vending machine 1 in order to receive the products. Namely, the user first operates the cell phone 32 so that the reception confirming screen HG2 is displayed on the display screen as shown in FIG. 5, and then makes the display screen face to the bar code reader 13 of the vending machine 1. Then, the bar code reader 13 scans the bar code image included in the reception confirming screen HG2 and reproduces the bar code as the receipt number information D3.

The job information extracting portion 106 extracts the request information D2 corresponding to the receipt number information D3 obtained by the receipt number obtaining portion 105 from the information storing portion 104. The extracted request information D2 is used as job information for processes in the money processing portion 107 and the job controlling portion 108 that will be explained below.

The money processing portion 107 calculates payment of the user in accordance with the request information D2 extracted by the job information extracting portion 106. For example, in the case of the request information D2 in which the receipt number is "00003", the payment is calculated to be ¥600. Then, the money processing portion 107 calculates the sum total of the slotted coins or bill, confirms that the sum total is equal to or more than the payment, and issues instruction to the job controlling portion 108 so as to give the product to the user. It is possible to constitute so that the payment can be done by a credit card or a prepaid card. In this case, the money processing portion 107 issues the instruction to the job controlling portion 108 after confirming that the credit card is valid or that the prepaid card is usable with a certain remained amount.

The job controlling portion 108 controls the product conveying mechanism 15 so that the product indicated in the job information is ejected to the outlet portion TG when receiving the instruction from the money processing portion 107. For example, in the case of the job information (request information D2) whose receipt number is "00003", the job controlling portion 108 controls so that three cans of coffee and two cans of orange juice are ejected to the outlet portion TG. However, if many products are ejected to the outlet portion TG at one time, there is a possibility of occurrence of a problem such as damage to the product. Therefore, the job controlling portion 108 controls so that plural products are ejected one by one, i.e., each of the products is ejected after it is confirmed that the previously ejected product is taken out of the outlet portion TG. As a method for confirming that the ejected product is taken out, a confirming screen is displayed on the display screen of the touch panel 12 or a voice guidance is performed so as to request the user to press a confirmation button every time when taking out the product. Alternatively, a sensor may be positioned at the outlet portion TG. When all the products designated in the job information are ejected to the outlet portion TG, the completion information D6 corresponding to this request information D2 (see FIG. 6) is changed to "completed".

Figure 7:
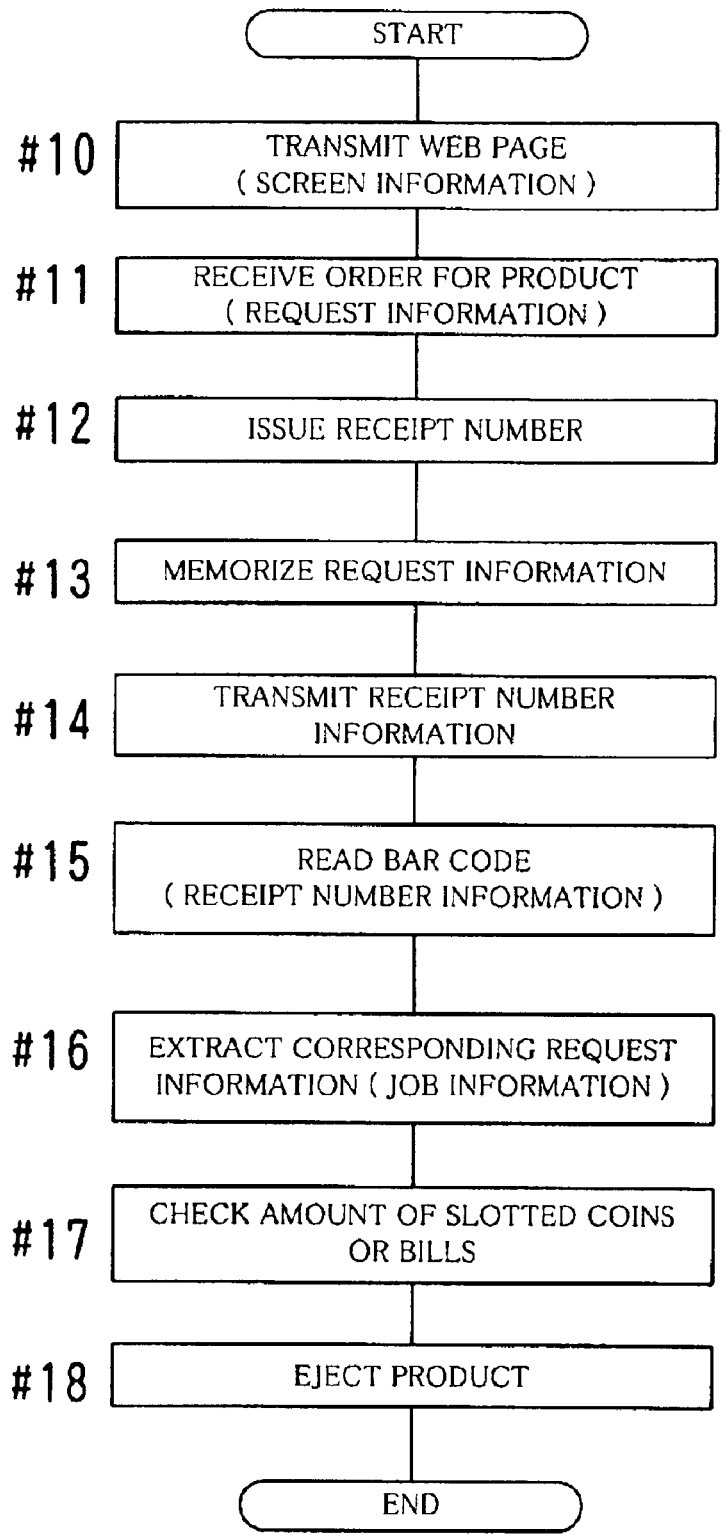
FIG. 7 is a flowchart for explaining an example of process performed by the vending machine.

Next, an example will be explained with reference to a flowchart in which a user buys a drink from the vending machine 1 by using the terminal 31. FIG. 7 is a flowchart for explaining an example of process performed by the vending machine 1.

For example, it is supposed that a meeting is held in a company that is a tenant of the building, a coffee break is set in the meeting, and a member of the meeting has to go to the vending machine 1 installed in the building and buy drinks for all members. This member (i.e., the user) operates the WWW browser in the terminal 31 that is installed in the meeting room and designates the URL of the web page of the vending machine 1.

Then, the vending machine 1 transmits the screen information D1 for the web page of the vending machine 1 to the terminal 31 as shown in FIG. 7 (#10).

On this occasion, the display screen of the terminal 31 displays the product ordering screen HG1 as shown in FIG. 4A. The user inputs products (drinks) that the members desire and the electronic mail address of the cell phone 32 of the user on the product ordering screen HG1, so that the request information D2 and the address information D2m are transmitted to the vending machine 1.

The vending machine 1 receives the request information D2 and the address information D2m from the terminal 31 (#11), then issues the receipt number (#12) and memorizes the request information D2 in connection with the receipt number (#13). At the same time or around the timing of the process of Step #13, the issued receipt number is transmitted as the receipt number information D3 to the cell phone 32 of the user (#14).

On the display screen of the cell phone 32 of the user, the reception confirming screen HG2 is displayed as shown in FIG. 5. The user goes to the lobby of the building and makes the display screen of the cell phone 32, on which the reception confirming screen HG2 is displayed, face to the bar code reader 13 of the vending machine 1.

The vending machine 1 reads the bar code of the reception confirming screen HG2 and obtains the receipt number information D3 that was issued to this member (#15). Then, the vending machine 1 searches the receipt number indicated by the obtained receipt number information D3 from the information storing portion 104 and extracts the request information D2 (the job information) corresponding to the identified receipt number (#16). Then, the vending machine 1 checks the amount of slotted coins and bills (#17) and ejects the products in order one by one to the outlet portion TG if the amount is equal to or more than the sum total of products indicated by the job information (#18).

According to this embodiment, the user can operate the terminal and reserve the products to buy from the vending machine. If the products that are vended by the vending machine are replaced with new types, users can check products in advance in the web page. Therefore, the user is not confused when deciding products to buy in front of the vending machine. In addition, the user does not need to drop coins and press buttons repeatedly, and therefore, the user can get products more easily than the case of the conventional vending machine. Therefore, the time for keeping other people waiting in line in front of the vending machine can be shorter than the case of the conventional vending machine. In addition, the user can feel free from pressure to decide products to buy in a short time, even if other people are waiting in line. Furthermore, when buying many kinds of products, the user does not need to take a memo of them.

In this embodiment, as a screen for requesting products, the product ordering screen HG1 shown in FIG. 4A is used for entering quantity of each product in each text box. Alternatively, a product ordering screen HG1' in imitation of a real vending machine 1 as shown in FIG. 4B can be used. In the product ordering screen HG1', a button BN2 (BN2a, BN2b, . . . ) corresponding to a desired product is clicked for selecting a product.

If drinks are vended in a paper cup, the user may select strong taste or mild taste, quantity of sugar, quantity of milk, with ice or without ice and other things. Direct debit can be used instead of dropping coins or bills in the vending machine 1 for the payment for the products, along with the payment of the toll for the cell phone 32.

The vending machine 1 reads the bar code displayed on the display screen of the cell phone 32 for obtaining the receipt number from the cell phone 32. Alternatively, it is possible that the vending machine 1 reads an identification code made of characters or numbers by using an OCR (Optical Character Reader) function for obtaining the receipt number. Still alternatively, it is possible that the vending machine 1 obtains the receipt number by connecting to the cell phone 32 via an interface such as a serial port, a USB (Universal Serial Bus) or IEEE1394. It is possible to use a wireless interface such as Bluetooth or to use a memory card. It is also possible to input the receipt number using the touch panel 12 or to obtain the receipt number by voice recognition using a microphone provided to the vending machine 1. These options can be applied to other embodiments, too.

The vending machine 1 can be applied to various vending machines such as a vending machine for drinks, a vending machine for music CDs, a ticket vending machine installed in a convenience store or a ticket vending machine for transportation.

[Second Embodiment]

Figure 8:
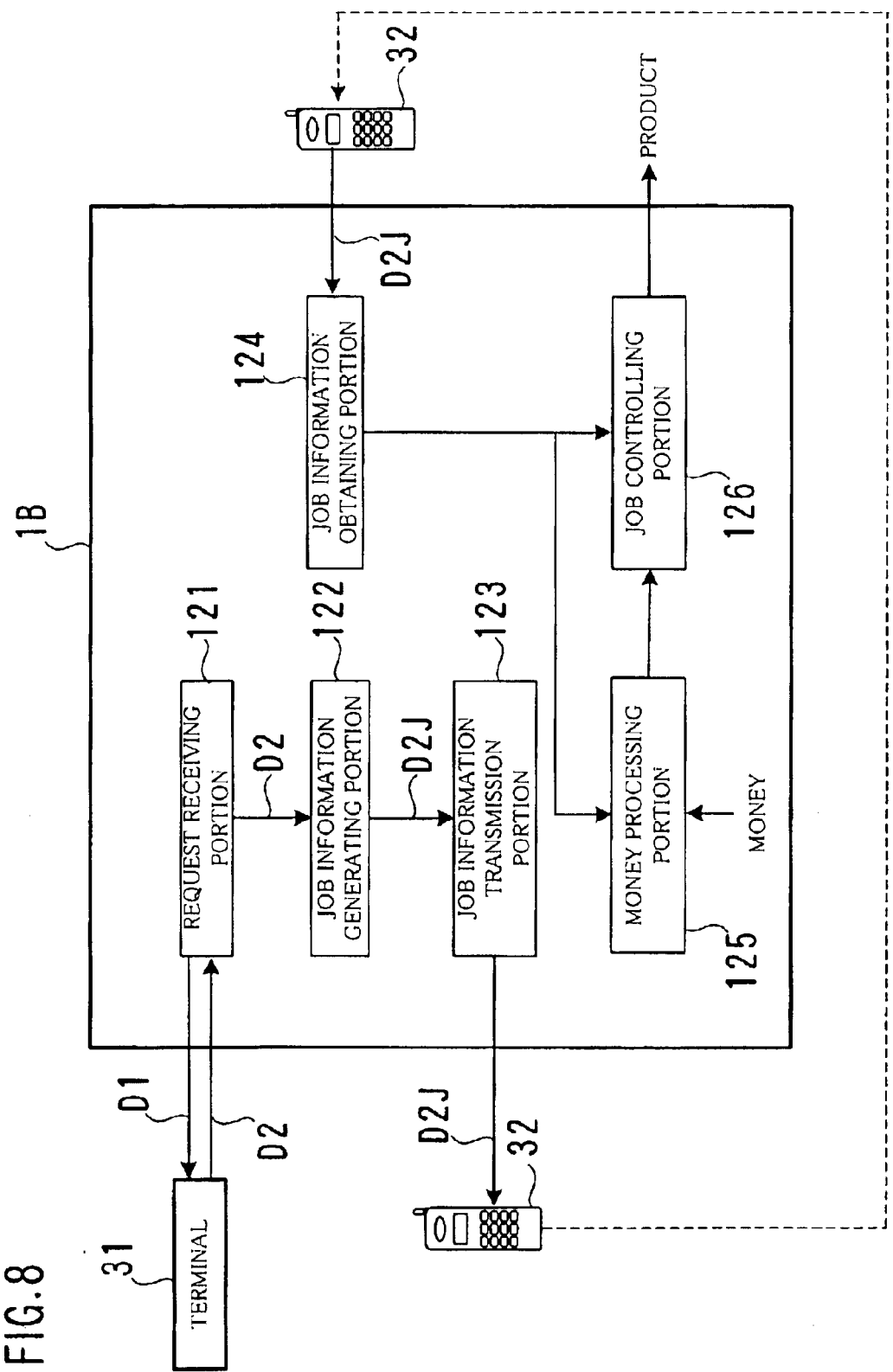
FIG. 8 is a block diagram for explaining an example of the functional structure of the vending machine.
Figure 9:
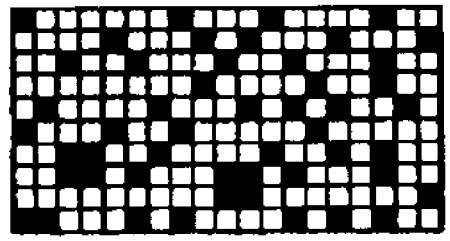
FIG. 9 is a diagram showing an example of the reception confirming screen.

FIG. 8 is a block diagram for explaining an example of the functional structure of the vending machine 1B. FIG. 9 is a diagram showing an example of the reception confirming screen HG2B.

In the first embodiment, the information about the order for products transmitted from the terminal 31, i.e., the request information D2 is stored in the vending machine 1. In contrast, the vending machine 1 of this embodiment does not store the request information D2, but the request information D2 is transmitted to the cell phone 32 as the job information indicated by a two-dimensional bar code.

The structure of the network system in this embodiment is the same as the network system W1 shown in FIG. 1. In addition, the hardware structure of the vending machine 1B of this embodiment is the same as the vending machine 1 shown in FIG. 2. However, the RAM 11b and the ROM 11c of the vending machine 1B stores program and data for realizing the following functions shown in FIG. 8.

In FIG. 8, a request receiving portion 121 receives the request information D2 and the address information D2m from the terminal 31 in the same way as the request receiving portion 101 shown in FIG. 3. A job information generating portion 122 converts the request information D2 received by the request receiving portion 121 into a two-dimensional bar code image and generates job information D2J. A job information transmission portion 123 transmits the generated job information D2J to the cell phone 32 indicated in the address information D2m. On the display screen of the cell phone 32 that received the job information D2J, the reception confirming screen HG2B including the two-dimensional bar code image is displayed as shown in FIG. 9.

A job information obtaining portion 124 reads the two-dimensional bar code displayed on the reception confirming screen HG2B of the cell phone 32 of the user who came to the vending machine 1, so as to obtain information about products and quantities that the user desires to buy. A money processing portion 125 and a job controlling portion 126 perform the same processes as the money processing portion 107 and the job controlling portion 108 shown in FIG. 3, respectively, in accordance with the information obtained by the job information obtaining portion 124.

According to this embodiment, the job information is stored not in the vending machine 1B but in the terminal 31 of the user, so the structure of the vending machine 1B can be simpler than the vending machine 1 of the first embodiment and cost of hardware can be reduced.

[Third Embodiment]

Figure 10:
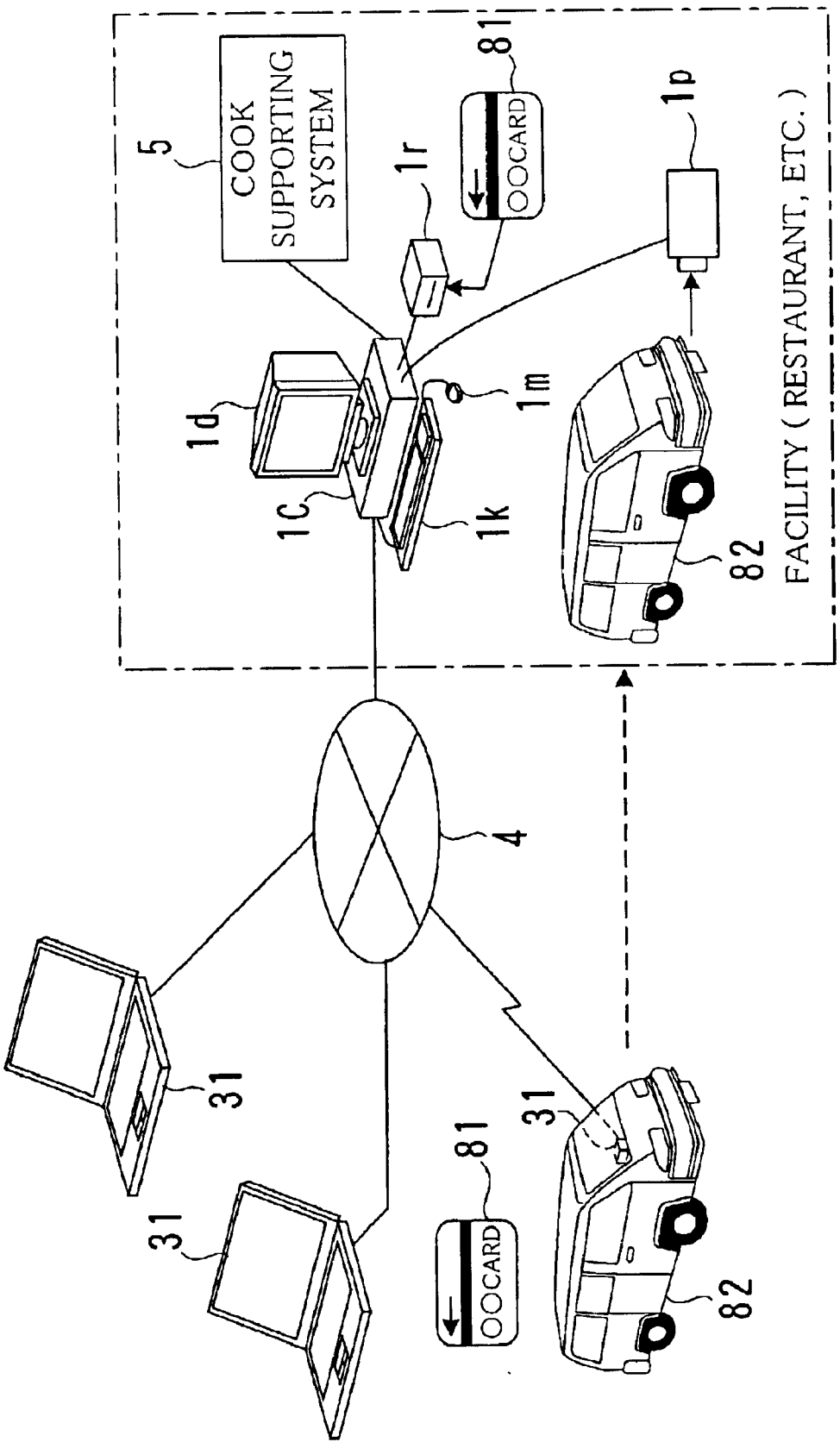
FIG. 10 is a diagram for explaining an example of a network system of a facility where a job managing apparatus of the present invention is installed.
Figure 11:
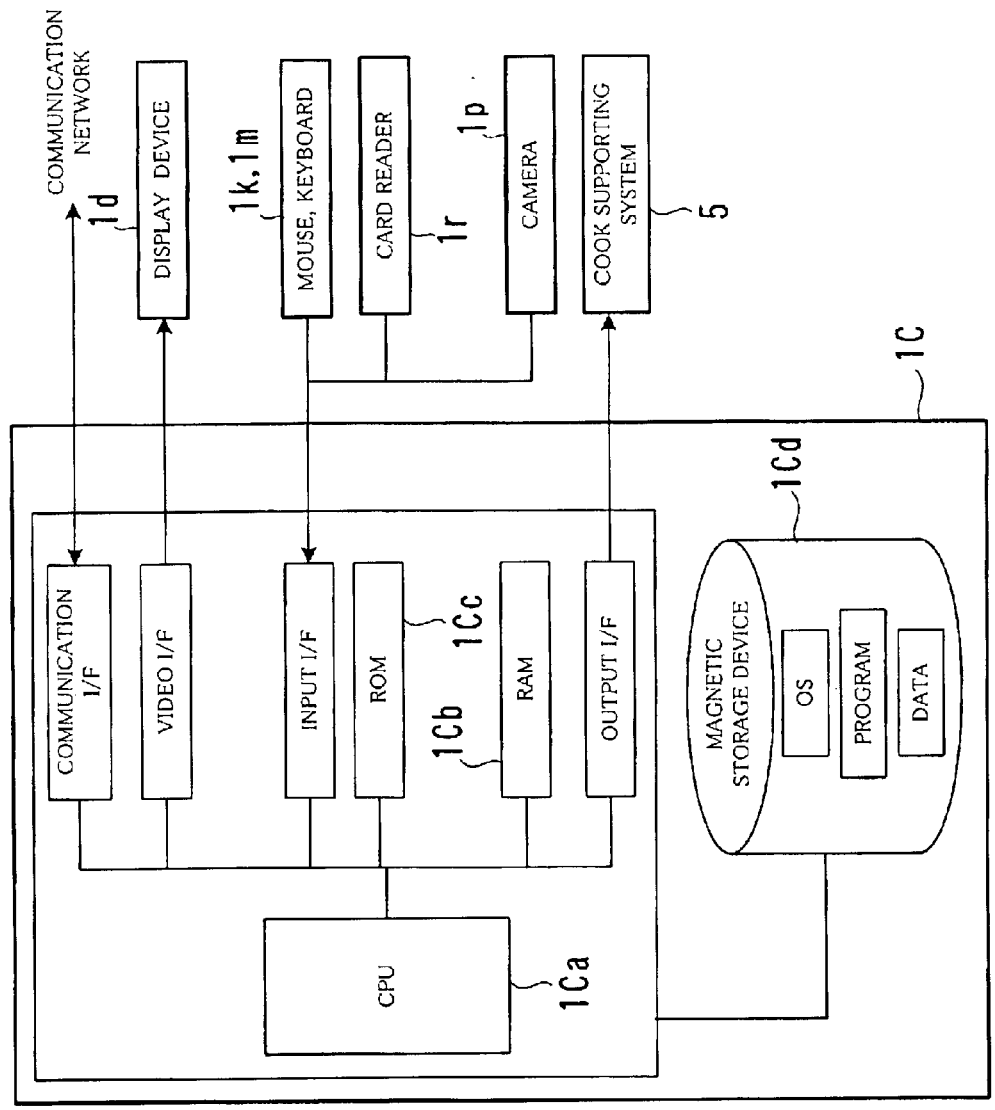
FIG. 11 is a diagram for explaining an example of a structure of the job managing apparatus.
Figure 12:
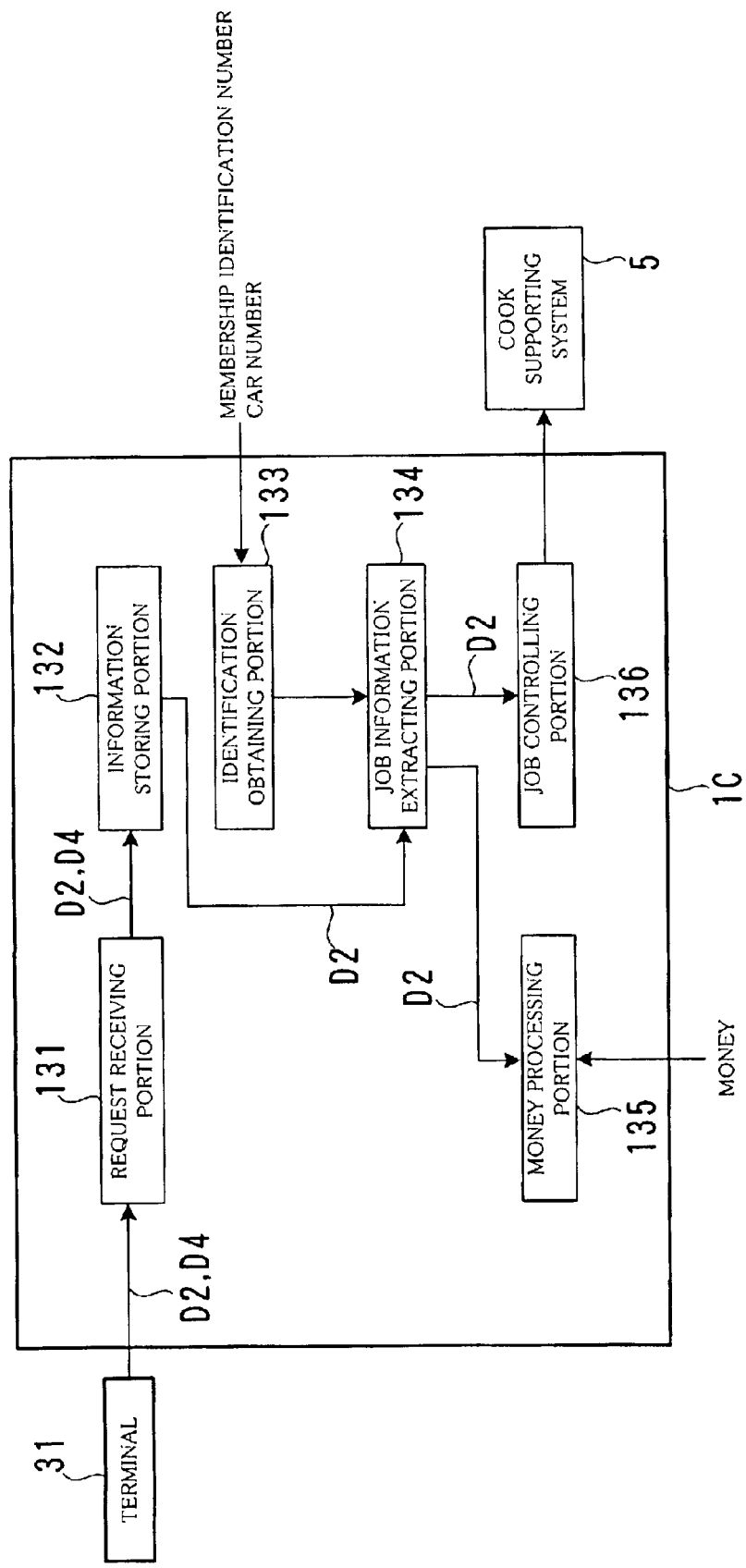
FIG. 12 is a diagram for explaining a functional structure of the job managing apparatus.

FIG. 10 is a diagram for explaining an example of a network system W3 of a facility where a job managing apparatus 1C of the present invention is installed. FIG. 11 is a diagram for explaining an example of a structure of the job managing apparatus 1C. FIG. 12 is a diagram for explaining a functional structure of the job managing apparatus 1C. FIG. 13 is a diagram showing an example of a dish ordering screen HG3.

In the first embodiment, the request information D2 is discriminated by issuing the receipt number information D3 for every request information D2. In contrast, this embodiment uses a membership card carried by the user or a number plate of the car of the user to discriminate each request information D2.

As shown in FIG. 10, the network system W3 in this embodiment includes a job managing apparatus 1C, a plurality of terminals 31 and the communication network 4. The job managing apparatus 1C is installed in a facility such as a restaurant or a gas station and performs various processes for providing users who visit the facility with services such as sales of products. Before visiting the facility, the user can select a desired service by operating the terminal 31. Hereinafter, an example will be explained in which the user selects dishes before visiting a restaurant.

As shown in FIG. 11, the job managing apparatus 1C comprises a CPU 1Ca, a RAM 1Cb, a ROM 1Cc, a magnetic storage device 1Cd and various interfaces. The magnetic storage device 1Cd stores various programs and data for realizing functions that will be explained later with reference to FIG. 12. The job managing apparatus 1C can be a personal computer or a workstation.

The job managing apparatus 1C is connected to an input device such as a display device 1d, a keyboard 1k or a mouse 1m, a card reader 1r and a camera 1p. The card reader 1r reads information recorded on membership cards 81 of users who visit the restaurant. The camera 1p reads the numbers on identification plates of cars (hereinafter, referred to as car numbers) of users who visit the restaurant. It is sufficient if the job managing apparatus 1C is connected to either the card reader 1r or the camera 1p. For example, if the restaurant has no parking lot, the job managing apparatus 1C may be connected to the card reader 1r. In the case of a drive-through restaurant, the job managing apparatus 1C may be connected to the camera 1p.

In addition, the job managing apparatus 1C is connected to a cook supporting system 5. The cook supporting system 5 supports jobs for providing dishes to users, e.g., informing the kitchen of ordered dishes or controlling automated portions of cooking process. The cook supporting system 5 starts the process after receiving an instruction from the job managing apparatus 1C.

As shown in FIG. 12, a request receiving portion 131 receives the request information D2 from the terminal 31 in the same way as the request receiving portion 101 shown in FIG. 3. The terminal 31 can be a personal computer, cell phone or a navigation system with a function of connecting to the Internet installed in the automobile 82.

Namely, the request receiving portion 131 transmits the screen information D1 for the dish ordering screen HG3 shown in FIG. 13 to the terminal 31. Then, the terminal 31 obtains the numbers of dishes that were entered by the dish ordering screen HG3 as the request information D2. Together with the request information D2, a membership identification number of the user of the terminal 31 to the restaurant is obtained as user identifying information D4. Instead of the membership identification number, the car number of the automobile 82 of the user can be obtained as the user identifying information D4. If the car number can be registered in the terminal 31 (in the navigation system), it is possible to transmit the car number automatically to the job managing apparatus 1C when the request information D2 is transmitted.

An information storing portion 132 memorizes the request information D2 received by the request receiving portion 131 in connection with the user identifying information D4. The memorized request information D2 is used as job information for controlling the cook supporting system 5.

An identification number obtaining portion 133 obtains the membership identification number from the membership card 81 of the user who visits the restaurant. Otherwise, it obtains the car number from the identification plate of the automobile 82 of the user. A job information extracting portion 134 extracts the request information D2 corresponding to the membership identification number or the car number obtained by the identification number obtaining portion 133 from the information storing portion 132.

A job controlling portion 136 gives an instruction to the cook supporting system 5 so as to cook in accordance with the request information D2. After receiving this instruction, the cook supporting system 5 starts the process for cooking.

A money processing portion 135 calculates the amount that is charged to the user in accordance with the request information D2. If a prepayment system is adopted like a fast food store, the process of the job controlling portion 136 may be performed after the money processing portion 135 confirms that the amount was paid similarly to the first embodiment.

According to this embodiment, the user can reserve dishes by operating the terminal so as not to be bothered about which dishes to order at the restaurant. Therefore, the restaurant can shorten the time from entrance of the user till the order resulting in high rate of turnover. In addition, the user (the consumer) can be free from a pressure that he or she should make an order soon even if the restaurant is crowded. Thus, he or she would not regret haste order and be satisfied with his or her selection.

Though the example of the job managing apparatus that performs process for ordering dishes is explained in this embodiment, it can be also applied to a vending machine. On the contrary, the structures of the first embodiment and the second embodiment can be applied to the job managing apparatus in the restaurant. Though the membership identification number or the car number is used as the user identification information in this embodiment, a cell phone number, a health insurance ID, a driver's license ID or a physical character such as finger print, voiceprint or retina identification can be used instead.

[Fourth Embodiment]

Figure 14:
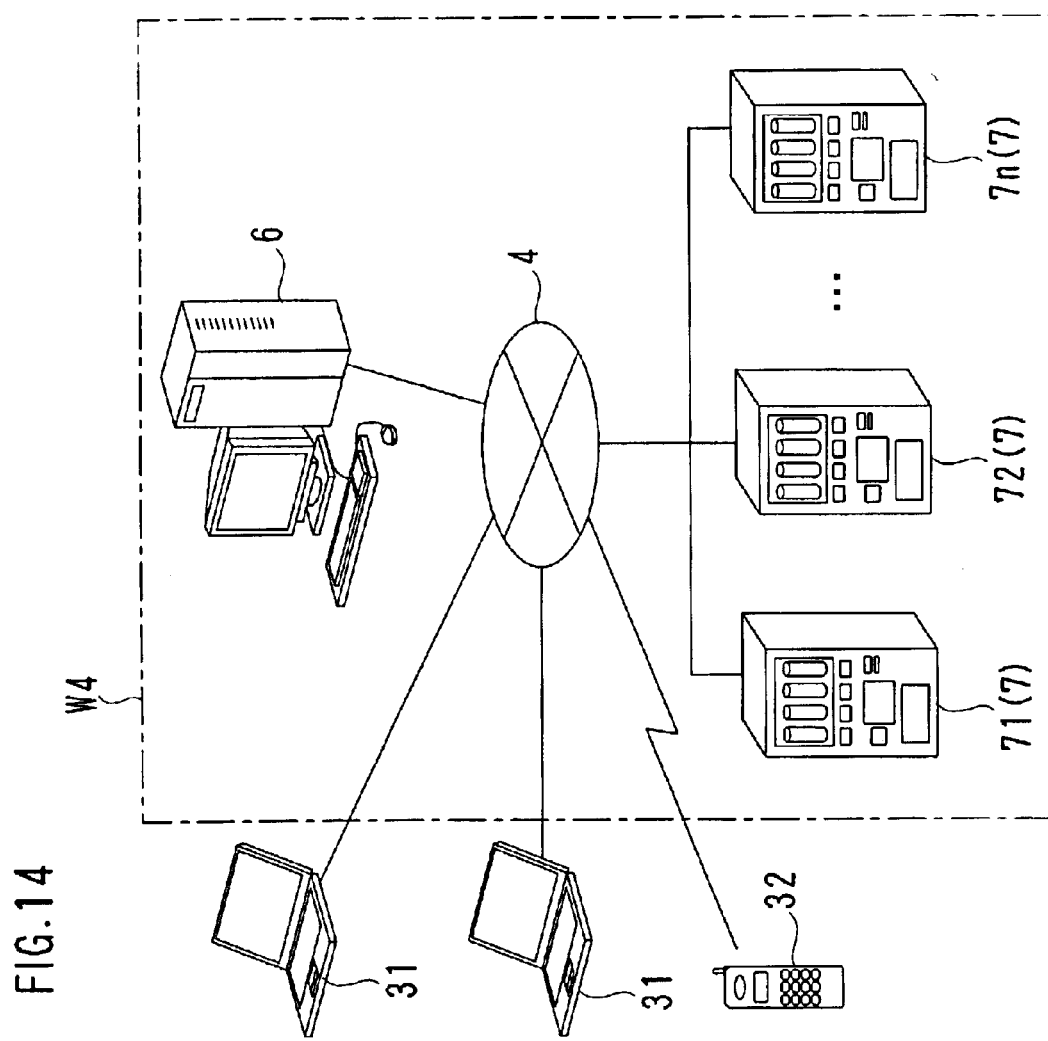
FIG. 14 is a diagram for explaining an example of a structure of a sales support system.
Figure 15:
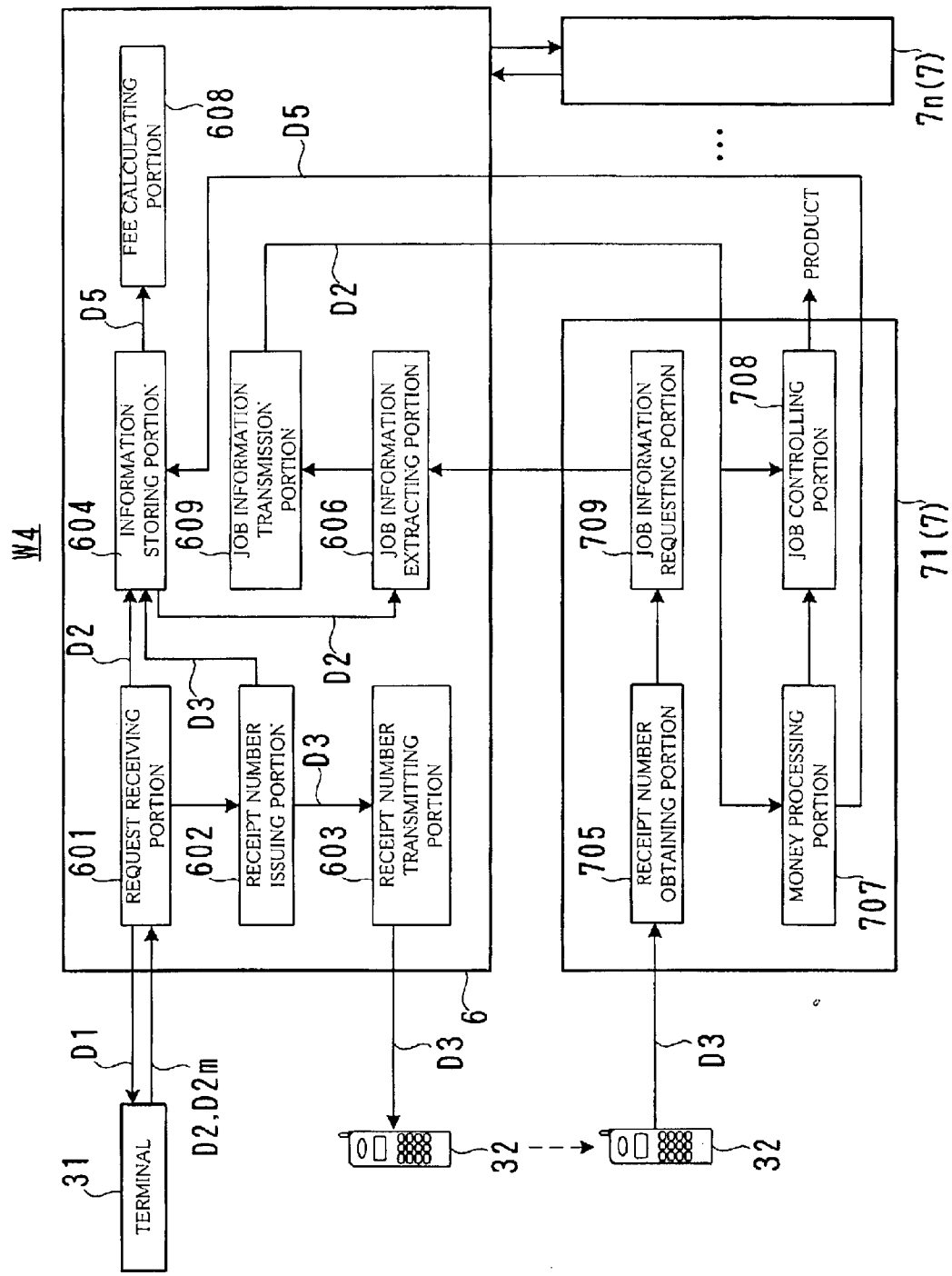
FIG. 15 is a diagram for explaining an example of a functional structure of an agent server and a vending machine.

FIG. 14 is a diagram for explaining an example of a structure of a sales support system W4. FIG. 15 is a diagram for explaining an example of a functional structure of an agent server 6 and a vending machine 7. FIG. 16 is a diagram showing an example of sales information D5 that is stored in an information storing portion 604. FIG. 17 is a diagram showing a variation of the request information D2 that is stored in the information storing portion 604.

In the first embodiment through the third embodiment, a system is explained having one service provision site such as a vending machine or a restaurant. In the fourth embodiment, a system will be explained having a plurality of service provision sites.

As shown in FIG. 14, the sales support system W4 comprises an agent server 6, a plurality of vending machines 7 (71, 72, ..., 7n), and a communication network 4. A user who intends to use the vending machine 7 operates the terminal 31 after connecting it to the agent server 6 in the same way as in the first embodiment, so as to decide desired products (drinks) in advance.

Namely, the agent server 6 provides intermediary service about an order for (a request for) a product between a user who intends to buy the product and a vending machine 7 to be used for buying the product. The hardware structure of the agent server 6 is similar to that of the job managing apparatus 1C shown in FIG. 11. However, the magnetic storage device stores various programs and data for realizing functions that will be explained later. The agent server 6 can be a UNIX server, a workstation or a personal computer.

The vending machines 71, 72, ... are installed in various places such as a lobby of a building, a pavilion in a shopping center or a waiting room in a station. The hardware structure of the vending machine 7 is similar to that of the vending machine 1 shown in FIG. 2. However, the RAM and the ROM store various programs and data for realizing functions that will be explained later.

According to this structure, functions such as a request receiving portion 601, a receipt number issuing portion 602, a receipt number transmitting portion 603, an information storing portion 604, a job information extracting portion 606, a fee calculating portion 608 and job information transmission portion 609 are realized in the agent server 6 as shown in FIG. 15. In addition, functions such as a receipt number obtaining portion 705, a money processing portion 707, a job controlling portion 708 and a job information requesting portion 709 are realized in the vending machine 7.

As understood by comparison between FIG. 15 and FIG. 3, the function of the vending machine 1 shown in FIG. 3 is performed by the agent server 6 and the vending machine 7 in FIG. 15. The elements having the same name in FIG. 15 and in FIG. 3 perform the same process. However, in order to perform transmission and reception of data between the agent server 6 and the vending machine 7, the agent server 6 has the job information transmission portion 609 while the vending machine 7 has the job information requesting portion 709. Furthermore, as means for the operator of the agent server 6 to collect fees from owners of the vending machines 7, the fee calculating portion 608 is provided to the agent server 6. Hereinafter, explanation of portions that are the same as in FIG. 3 are omitted, and other portions will be explained.

The request receiving portion 601 receives the request information D2 and the address information D2m from the terminal 31 similarly to the request receiving portion 101 shown in FIG. 3. However, screen information D1 (D11, D12, ...) for web pages corresponding to vending machines 71, 72, ... is prepared, and for example, if the URL of the vending machine 71 is designated, the screen information D11 is transmitted to the terminal 31. A common screen information D1 can be prepared for plural vending machines 7 that have the same products to be sold.

The receipt number obtaining portion 705 obtains receipt number information D3 from the cell phone 32 of the user who comes to the front of the vending machine 7 for receiving the products, similarly to the receipt number obtaining portion 105. It is possible that the user comes to a wrong vending machine 7 (e.g., the vending machine 72) different from the vending machine 7 designated upon the order (e.g., the vending machine 71). In this case, a message indicating that it is a wrong vending machine should be shown to the user. Alternatively, if the vending machines 71 and 72 are owned by the same owner and the vending machine 72 can also vend the product selected by the user, the vending machine 72 may vend the product instead of the vending machine 71.

The job information requesting portion 709 requests the agent server 6 to transmit the request information D2 corresponding to the receipt number information D3 of the user that was obtained by the receipt number obtaining portion 705. The job information extracting portion 606 of the agent server 6 responds to this request and extracts the request information D2 corresponding to the receipt number information D3 from the information storing portion 604. The job information transmission portion 609 transmits the extracted request information D2 to the vending machine 7 that made the request. This request information D2 is used as the job information for processes in the money processing portion 707 and the job controlling portion 708.

The money processing portion 707 calculates the sum total of slotted coins and bills similarly to the money processing portion 107 and informs the agent server 6 of the sales amount of the vending machine 7 as the sales information D5. The sales information D5 can be transmitted every completion of delivering products for one request or every constant period of time (e.g., every one week).

The information storing portion 604 stores the request information D2 similarly to the information storing portion 104 and stores the sales information D5 received from each vending machine 7 as shown in FIG. 16. The fee calculating portion 608 calculates the fee for using the agent server 6, i.e., the agency fee for sales collected from owners of the vending machines 7 in accordance with the sales information D5 stored in the information storing portion 604. For example, sum total of sales in a predetermined period is calculated in accordance with the sales information D5 of the vending machine 7, and a few percents of the sum total is charged to the owner of the vending machine 7 as the agency fee.

Furthermore, the money processing portion 707 may transmit information about the completion of the sales of the products indicated in the job information (the request information D2) to the agent server 6 as the sales information D5. In this case, after receiving the sales information D5 the information storing portion 604 stores the device name of the vending machine 7 that sent the sales information D5 in connection with the request information D2 as shown in FIG. 17. Then, the fee calculating portion 608 calculates the sum total of sales of each of the vending machines 7 and the agency fee in accordance with the request information D2 and the price of each product. This is performed also to a fifth embodiment that will be explained later.

Figure 18:
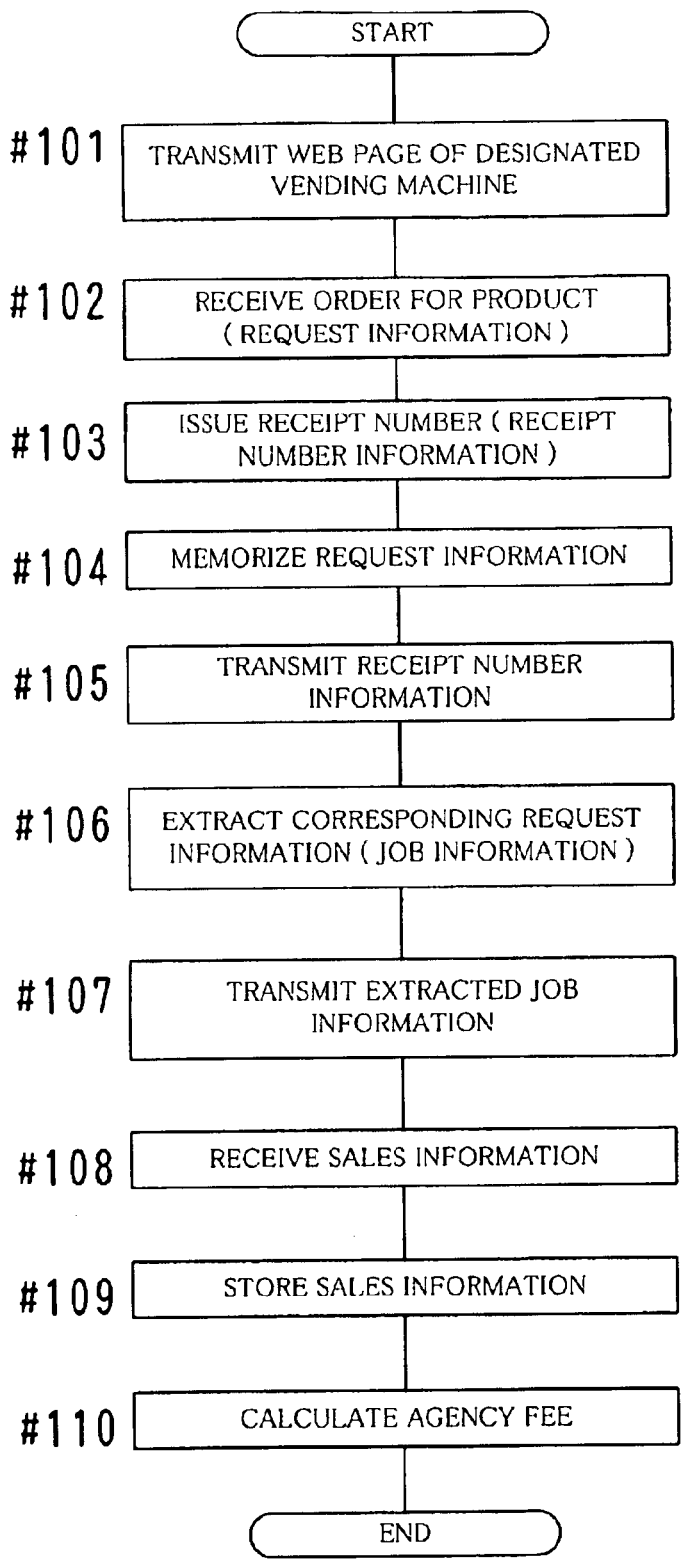
FIG. 18 is a flowchart for explaining an example of the process flow of the agent server.
Figure 19:
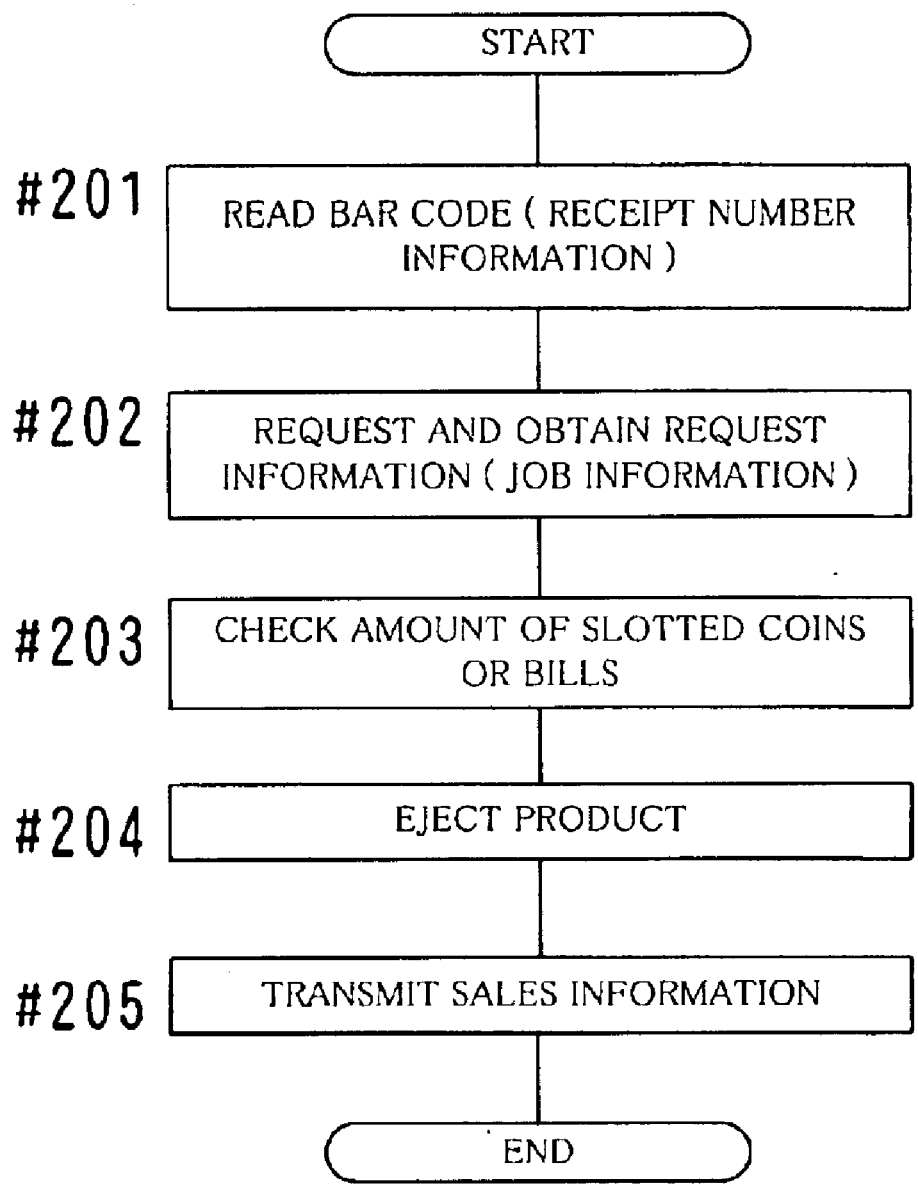
FIG. 19 is a flowchart for explaining an example of the process flow of the vending machine.

Next, process flow of the agent server 6 and the vending machine 7 will be explained with reference to flowcharts. FIG. 18 is a flowchart for explaining an example of the process flow of the agent server 6. FIG. 19 is a flowchart for explaining an example of the process flow of the vending machine 7.

As shown in FIG. 18, the agent server 6 transmits the web page (the screen information D1) for the product ordering screen HG1 of the vending machine 7 to the terminal 31 every time when the terminal 31 designates the URL of the web page of the vending machine 7 (#101).

The agent server 6 issues the receipt number every time when receiving order information of a product, i.e., the request information D2 and the address information D2$m$ from the terminal 31, and stores the request information D2 in connection with the receipt number (#102–#104). Furthermore, the agent server 6 transmits the issued receipt number (the receipt number information D3) to the cell phone 32 indicated by the address information D2$m$ (#105).

As shown in FIG. 19, the vending machine 7 requests the agent server 6 for the request information D2 (job information) corresponding to the receipt number information D3 every time when reading a bar code displayed on the cell phone 32 of the user who came there and obtaining the receipt number information D3 (#201, #202).

The agent server 6 extracts the corresponding request information D2 from the information storing portion 604 every time when receiving the request from the vending machine 7, and transmits the information to the vending machine 7 that made the request (#106, #107).

The vending machine 7 checks the deposited amount in accordance with the job information obtained from the agent server 6 (#203) and ejects the product to the outlet portion TG (#204). Then the vending machine 7 transmits the sales information D5 to the agent server 6 at a predetermined timing (#205).

The agent server 6 stores the sales information D5 in connection with the vending machine 7 that made the transmission every time when receiving the sales information D5 from the vending machine 7 (#108, #109). Then the agent server 6 calculates agency fee of each vending machine 7 at a predetermined timing (#110).

[Fifth Embodiment]

Figure 20:
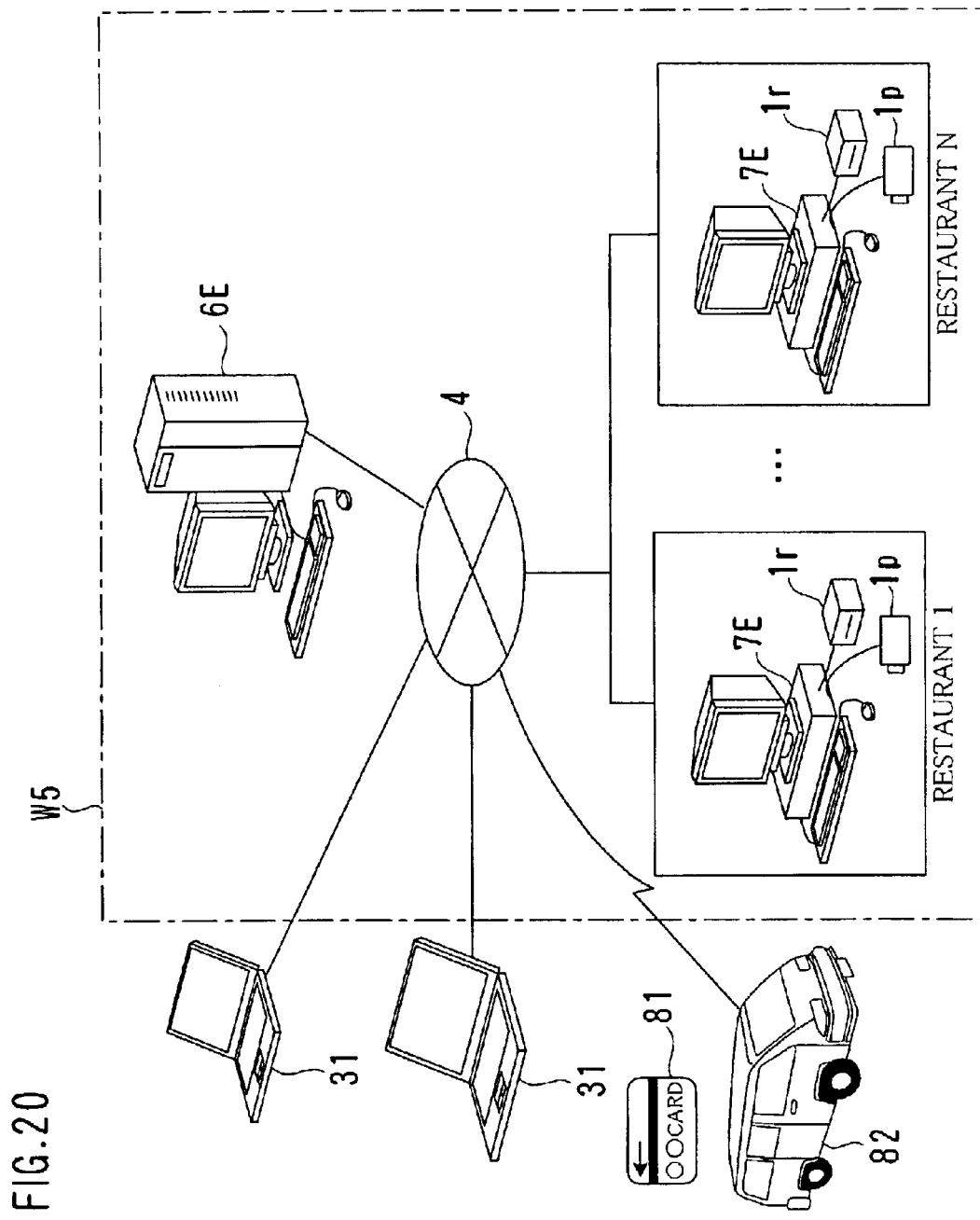
FIG. 20 is a diagram for explaining an example of a structure of a restaurant support system.
Figure 21:
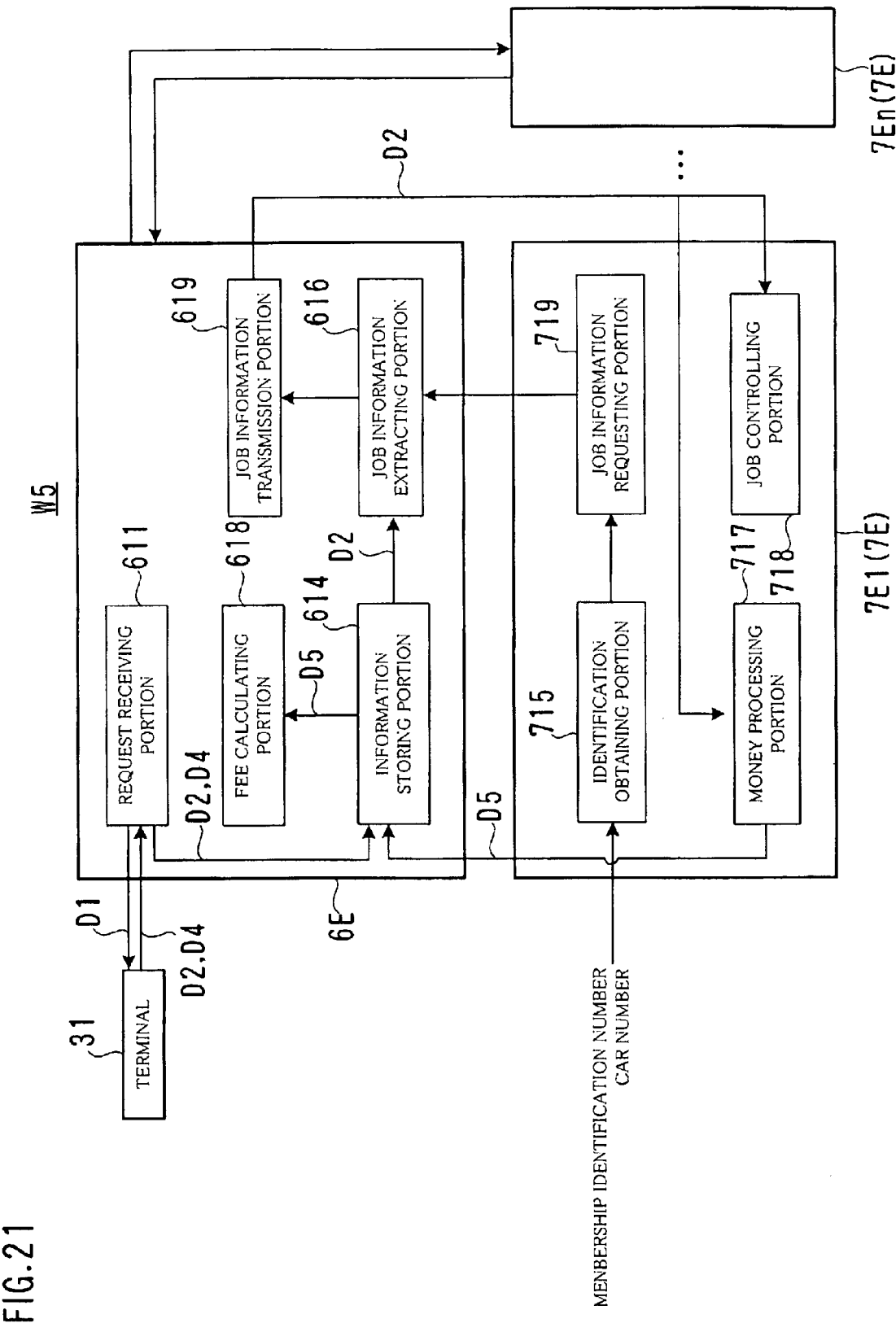
FIG. 21 is a diagram for explaining an example of a functional structure of an agent server and a store terminal.

FIG. 20 is a diagram for explaining an example of a structure of a restaurant support system W5. FIG. 21 is a diagram for explaining an example of a functional structure of an agent server 6E and a store terminal 7E.

The function of the vending machine 1 shown in FIG. 3 is performed by the agent server 6 and the vending machine 7 in the fourth embodiment. In this embodiment, the function of the job managing apparatus 1C shown in FIG. 12 is performed by the agent server 6E and the store terminal 7E so as to constitute the system.

As shown in FIG. 20, the restaurant support system W5 comprises an agent server 6E, a plurality of store terminals 7E and a communication network 4. Similarly to the third embodiment, the terminal 31 can be a personal computer, a cell phone or a navigation system. A user can decide desired dishes in advance before arriving at the restaurant by the operation similar to the third embodiment.

Each of the restaurants is provided with at least one store terminal 7E. The hardware structure of the store terminal 7E is the same as the job managing apparatus 1C shown in FIG. 11. The agent server 6E works as an agency between the restaurant and the user about ordering or others similarly to the agent server 6 in the fourth embodiment. However, the magnetic storage devices of the store terminal 7E and the agent server 6E store programs and data for performing the processes that will be explained below with reference to FIG. 21.

As understood by comparison between FIG. 21 and FIG. 15, the functional structures of the agent servers 6E and 6 are the same fundamentally. Similarly, the functional structures of the store terminal 7E and the vending machine 7 are the same fundamentally. However, there is a difference in that the sales support system W4 in the fourth embodiment issues the receipt number information D3 for discriminating information of orders made by users, i.e., the request information D2, while the restaurant support system W5 in this embodiment discriminates the request information D2 by using the membership card 81 of the user or the automobile 82. Hereinafter, a part of the functional structure of the restaurant support system W5 that is different from the case of the fourth embodiment will be explained.

A request receiving portion 611 obtains the request information D2 (order for products) and the user identifying information D4 (the membership card identification or the car number of the user) from the terminal 31, and an information storing portion 614 stores this request information D2 in connection with the user identifying information D4.

An identification number obtaining portion 715 obtains the membership identification number or the car number of the user who visited the restaurant. A job information requesting portion 719 requests the agent server 6E for the request information D2 (the job information) corresponding to the obtained membership identification number or the car number.

A money processing portion 717 calculates the payment of the user in accordance with the request information D2 received from the agent server 6E. A job controlling portion 718 gives an instruction to the cook supporting system 5 so that the dish indicated in the request information D2 is prepared.

According to the fourth embodiment or the fifth embodiment, the agent server performs the common process among the vending machines or the store terminals, so the structure of the vending machine or the store terminal can be simpler than the case of the first embodiment or the third embodiment. In addition, the total cost of the system can be reduced.

Though the sales support system W4 in the fourth embodiment includes a plurality of vending machines for drinks, other kinds of vending machine can be provided, e.g., a vending machine for music records, a vending machine for foods or a vending machine for music CDs. In addition, the store terminal can be installed in various kinds of stores such as a coffee shop, a bank, a post office, a convenience store or a gas station, so as to constitute a system similar to the restaurant support system W5 of the fifth embodiment.

Though the vending machine, the job managing apparatus or the agent server has the web server function such as transmission of the screen information for a web page or obtainment of orders (request information) in the first embodiment through the fifth embodiment, it is possible that a web server administered by an Internet service provider has such a function.

Though an example of the case where a service is provided to the user via the vending machine or the job managing apparatus in the restaurant is explained in the first embodiment through the fifth embodiment, the present invention can be applied to various cases such as a cash dispenser, a money changer, a copy machine, a facsimile machine, a feeder of a self-service gas station.

Figure 22:
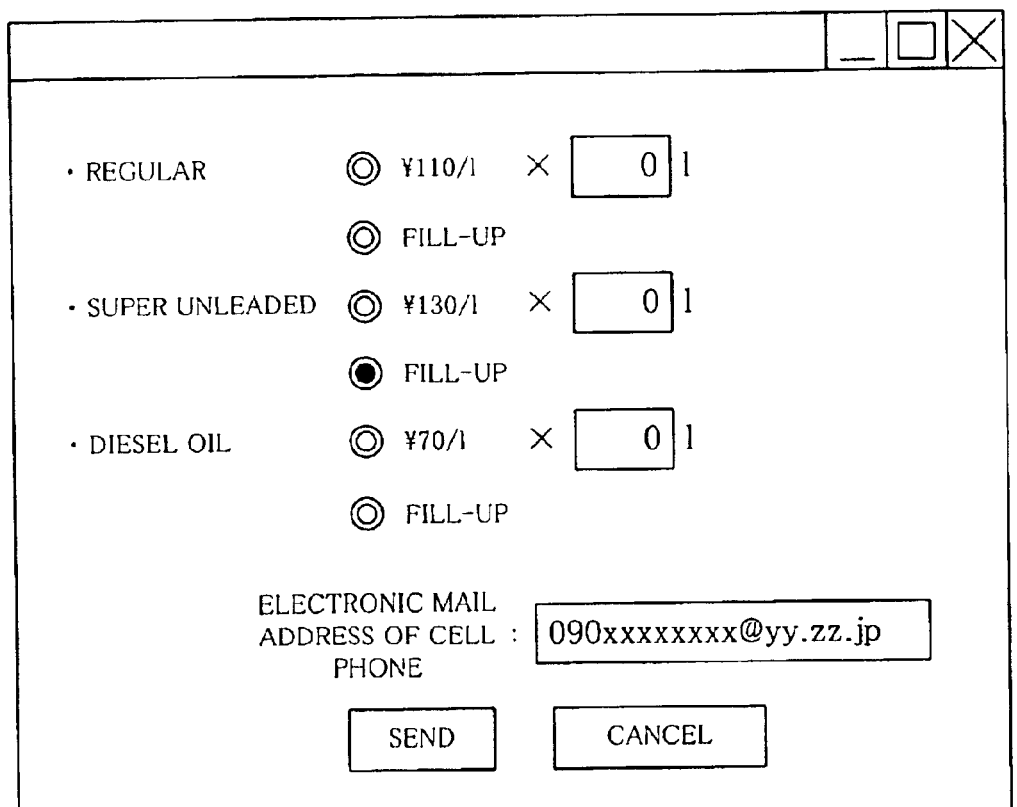
FIG. 22 shows an example of a fuel selection screen.

FIG. 22 shows an example of a fuel selection screen HG4. For example, in the case of the feeder of a self-service gas station, the fuel selection screen HG4 shown in FIG. 22 is displayed on the display screen of the terminal 31, so that a type and quantity of a desired fuel can be selected. A user who arrived at the gas station makes identification plate of his or her car be read by an installed camera, puts a feeder nozzle into the inlet to the fuel tank of the car and deposits money, so that fuel is fed as selected in the fuel selection screen in advance.

The entire or a part of the systems W1–W5, the vending machines 1, 1B and 7, the job managing apparatus 1C, the agent servers 6 and 6E and the store terminal 7E or contents of process or order of process can be changed in accordance with the scope of the present invention.

According to the present invention, the user can select a desired service in advance and can receive service provision without minding a sales clerk or other users who are waiting in line.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A vending machine that ejects a product stored therein in response to an instruction of a user, comprising:
    first transmission means for transmitting a product ordering screen to a user terminal for display thereby, via a network, in accordance with an instruction from the user terminal;
    means for receiving request information written on the product ordering screen displayed by the user terminal and transmitted from the user terminal;
    means for issuing identifying information corresponding to the received request information;
    means for storing the received request information in connection with the corresponding identifying information;
    second transmission means for transmitting the issued and stored, corresponding identifying information to a terminal designated by the user;
    means for obtaining the corresponding identifying information, received by the designated terminal, when the designated terminal is afforded access to the vending machine;
    means for extracting, from the storing means, the stored request information corresponding to the identifying information obtained by the obtaining means, and
    means for controlling ejection of a product in accordance with the extracted request information.

2. A vending machine as recited in claim 1, wherein the designated terminal is the user terminal.

3. A vending machine as recited in claim 2, wherein the user terminal is a portable terminal.

4. A vending machine as recited in claim 1, wherein the user terminal is product ordering terminal and the designated terminal is a product procuring terminal.

5. A vending machine that ejects a product stored therein in response to an instruction of a user, comprising:
    a first transmitter transmitting a product ordering screen to a user terminal for display thereby, via a network, in accordance with an instruction from the user terminal;
    a receiver receiving request information written on the product ordering screen displayed by the user terminal and transmitted from the user terminal;
    a first unit issuing identifying information corresponding to the received request information;
    a memory storing the received request information in connection with the corresponding identifying information;

a second transmitter transmitting the issued and stored, corresponding identifying information to a terminal designated by the user;

a second unit obtaining the corresponding identifying information, received by the designated terminal, when the designated terminal is afforded access to the vending machine;

an extractor extracting, from the memory, the stored request information corresponding to the identifying information obtained by the obtaining unit; and a controller controlling ejection of a product in accordance with the extracted request information.

6. A vending machine as recited in claim 5, wherein the designated terminal is the user terminal.

7. A vending machine as recited in claim 6, wherein the user terminal is a portable terminal.

8. A vending machine as recited in claim 5, wherein the user terminal is product ordering terminal and the designated terminal is a product procuring terminal.

9. A method of operating a vending machine that ejects a product stored therein, in response to an instruction of a user, comprising:

transmitting a product ordering screen to a user terminal for display thereby, via a network, in accordance with an instruction from the user terminal;

receiving request information written on the product ordering screen displayed by the user terminal and transmitted from the user terminal;

issuing identifying information corresponding to the received request information;

storing the received request information in connection with the corresponding identifying information;

transmitting the issued and stored, corresponding identifying information to a terminal designated by the user;

obtaining the corresponding identifying information, received by the designated terminal, when the designated terminal is afforded access to the vending machine;

extracting, from the memory, the stored request information corresponding to the identifying information obtained by the obtaining unit; and controlling ejection of a product in accordance with the extracted request information.

10. A vending machine as recited in claim 9, wherein the designated terminal is the user terminal.

11. A vending machine as recited in claim 10, wherein the user terminal is a portable terminal.

12. A vending machine as recited in claim 9, wherein the user terminal is product ordering terminal and the designated terminal is a product procuring terminal.

13. A storage storing a machine-readable program controlling a vending machine to eject a product stored therein in response to an instruction of a user by:

transmitting a product ordering screen to a user terminal for display thereby, via a network, in accordance with an instruction from the user terminal;

receiving request information written on the product ordering screen displayed by the user terminal and transmitted from the user terminal;

issuing identifying information corresponding to the received request information;

storing the received request information in connection with the corresponding identifying information;

transmitting the issued and stored, corresponding identifying information to a terminal designated by the user;

obtaining the corresponding identifying information, received by the designated terminal, when the designated terminal is afforded access to the vending machine;

extracting, from the memory, the stored request information corresponding to the identifying information obtained by the obtaining unit; and controlling ejection of a product in accordance with the extracted request information.

14. A vending machine as recited in claim 13, wherein the designated terminal is the user terminal.

15. A vending machine as recited in claim 14, wherein the user terminal is a portable terminal.

16. A vending machine as recited in claim 13, wherein the user terminal is product ordering terminal and the designated terminal is a product procuring terminal.

* * * * *

UNITED STATES PATENT AND TRADEMARK OFFICE
CERTIFICATE OF CORRECTION

PATENT NO.    : 6,819,976 B2
DATED         : November 16, 2004
INVENTOR(S)   : Shuji Kimura It is certified that error appears in the above-identified patent and that said Letters Patent is hereby corrected as shown below:

<u>Title page,</u>
Item [57], ABSTRACT,
Lines 2 and 4, replace ";" with -- , --.

Signed and Sealed this

Third Day of May, 2005

JON W. DUDAS
*Director of the United States Patent and Trademark Office*